US005612765A

United States Patent [19]

Yoshikawa et al.

[11] Patent Number: 5,612,765
[45] Date of Patent: Mar. 18, 1997

[54] FILM CARTRIDGE CARRIER

[75] Inventors: Tohru Yoshikawa; Yoshiyuki Yamaji, both of Wakayama, Japan

[73] Assignee: Noritsu Koki Co., Ltd., Wakayama, Japan

[21] Appl. No.: 417,121

[22] Filed: Apr. 5, 1995

[30] Foreign Application Priority Data

Apr. 7, 1994 [JP] Japan ..................................... 6-069658

[51] Int. Cl.⁶ ............................ G03B 27/58; G03B 27/52
[52] U.S. Cl. ............................ 355/72; 198/406; 209/539; 209/546; 355/40
[58] Field of Search ................................ 355/72, 75, 54; 354/219; 414/403; 198/131, 539, 540, 406–8; 209/546, 539, 540

[56] References Cited

U.S. PATENT DOCUMENTS

| | | | |
|---|---|---|---|
| 3,753,486 | 8/1973 | Vogt et al. ............................... | 198/131 |
| 3,776,405 | 12/1973 | Gade ....................................... | 214/310 |
| 3,880,294 | 3/1975 | Arseneault .................................. | 214/1 |
| 4,253,788 | 3/1981 | Oaks et al. ............................... | 414/403 |
| 4,731,628 | 3/1988 | Uenaka et al. .. | |
| 4,732,278 | 3/1988 | Zangenfeind et al. .................. | 209/546 |
| 5,093,686 | 3/1992 | Shigaki . | |
| 5,181,824 | 1/1993 | Thomas ................................... | 414/751 |
| 5,458,455 | 10/1995 | Oyama et al. ......................... | 414/791.1 |

Primary Examiner—Arthur T. Grimley
Assistant Examiner—Herbert V. Kerner
Attorney, Agent, or Firm—Wenderoth, Lind & Ponack

[57] ABSTRACT

A carrier device can receive cartridges each containing a film from a lateral direction and send them reliably, efficiently and continuously to a photoprinting machine in a straight line, while holding them in position with an arm. Cartridges are supplied one by one into the carrier device from a cartridge housing device located at the side of the carrier device. A cartridge set in a carriage or the carrier device is retained in position by the arms and transferred to the printing machine by driving the carriage with a motor of a driving unit along a guide path. The carriage has a cartridge retaining mechanism and an arm locking mechanism.

9 Claims, 15 Drawing Sheets

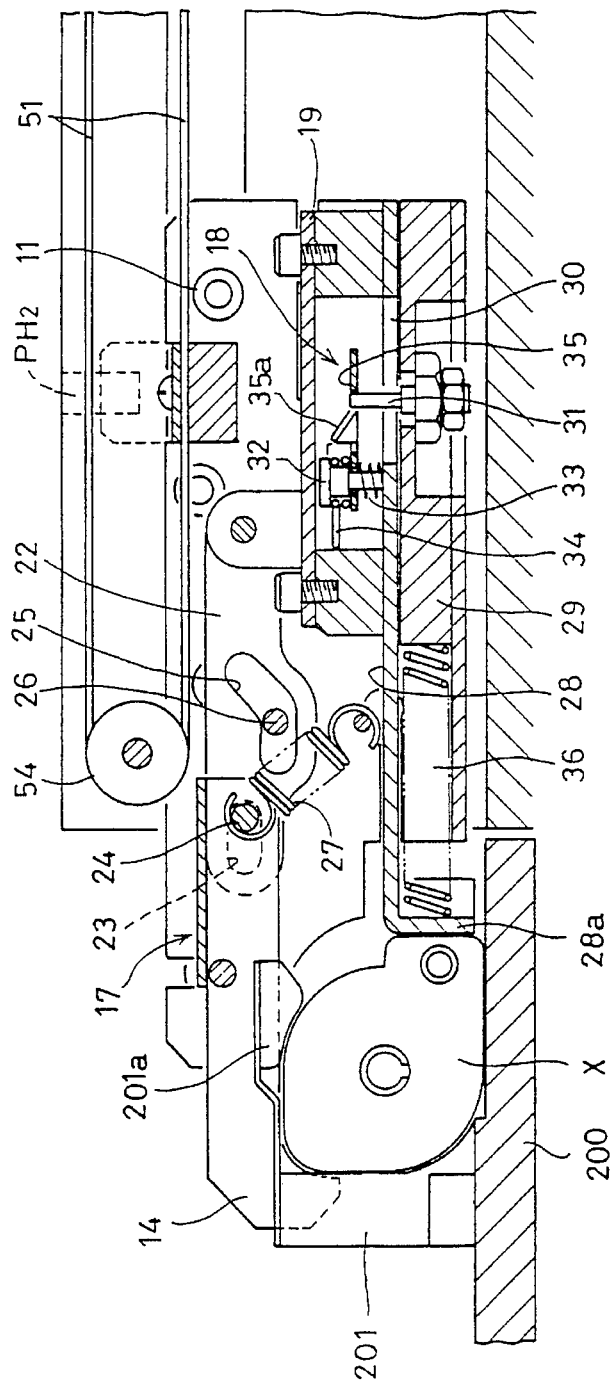
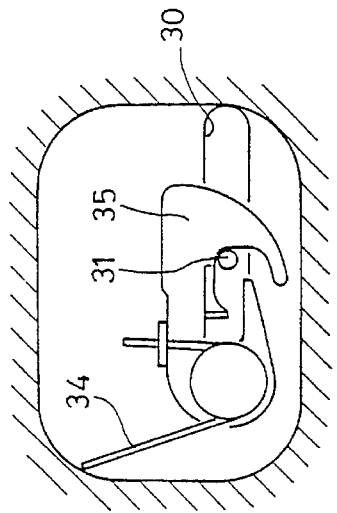
FIG. 6A
FIG. 6B

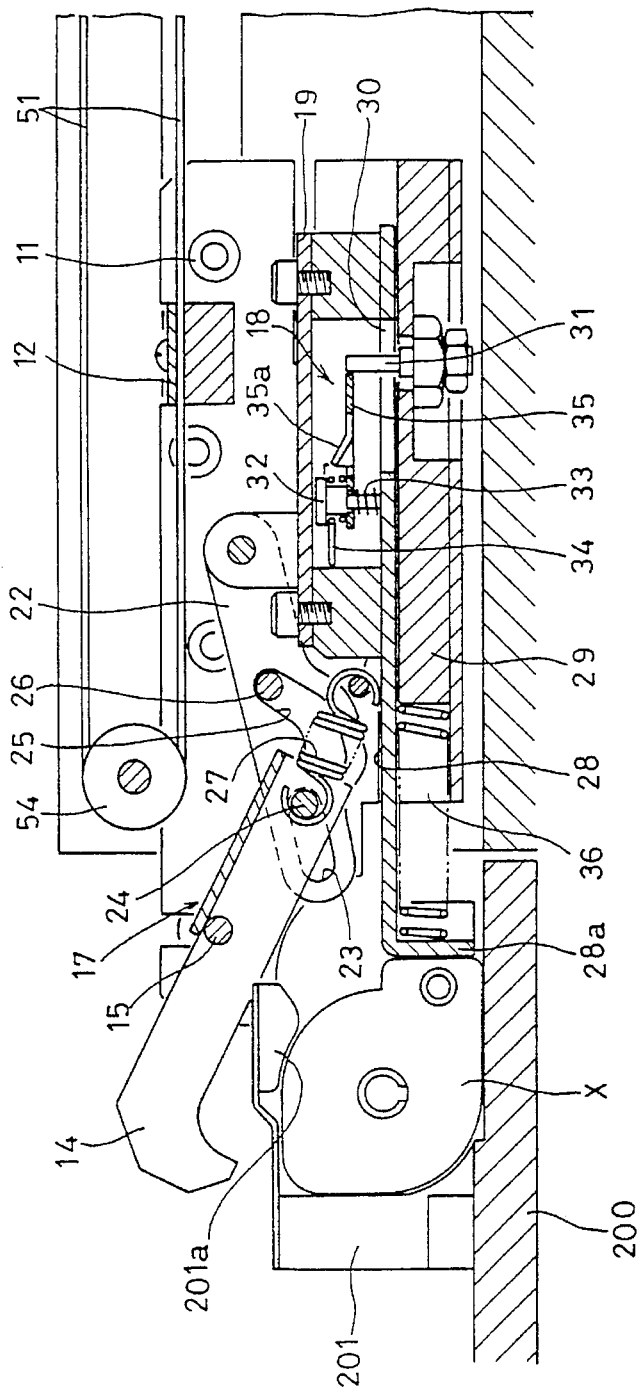
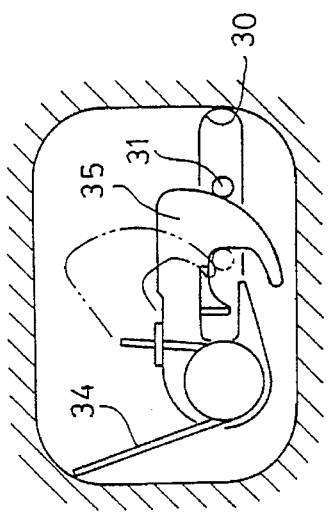
FIG. 8A.
FIG. 8B

FILM CARTRIDGE CARRIER

BACKGROUND OF THE INVENTION

This invention relates to a carrier for carrying film-accommodating cartridges into a photoprinting device.

In order to print images on a film onto a photosensitive material in a photoprinting device, the film is first taken out of its cartridge (or patrone), and fed in a straight line by a carrier device while reading image data with a scanner unit provided in the path. The film is then printed after adjusting the exposure conditions of the printing/exposure means based on the image data.

If a large number of films have to be printed continuously, the operating efficiency will be low if they were manually fed one by one. Thus, many films were fed into the printing/exposure means after taking them out of the cartridges and splicing them together into a single web.

But even with this method, the efficiency is not high enough because a rather long time is required to splice many films together.

Also, because many films are connected together in a single web, the step of reading image data with the scanner and the step of printing images on films with the printing/exposure means interfere with each other. In other words, reading the data is possible only after printing is finished and printing is discontinued while data are being read.

In one proposed arrangement, a loop guide is provided between the printing/exposure means and the scanner so that they are operable independently of each other. With this arrangement, it is possible to temporarily store a web of films in a loop with the loop guide after reading their image data, and then print these films continuously with the printing/exposure means.

This method is, however, not applicable to the case where films are processed without taking them out of the cartridges. When processing films without taking them out of the cartridges, there are problems. In order to solve these problems, a photoprinting/processing device of a rotary table type has been proposed.

In the arrangement in which a plurality of films are spliced together, films have to be separated from their patrones. Thus, after printing, it is necessary to cut the films to strips of a suitable length each carrying several frames and to put each strip in a separate film holder before returning them to customers. Such work is extremely troublesome and time-consuming.

Thus, a photoprinting/processing device having a rotary table provided between the scanner and the printing/exposure means has been proposed. In this arrangement, a plurality of cartridges are brought onto the rotary table so that the scanner can read image data on one film while another film is being printed by the printing/exposure means without separating films from the cartridges.

Apart from this rotary table type photoprinting/processing device, a photoprinting device of the type having a cartridge housing for supplying a plurality of cartridges containing films for continuous printing.

In this device, the cartridge housing is used to supply films directly into the printing device from the cartridges. But it would also be possible to use this cartridge housing to supply films into the rotary table type photoprinting device.

But this arrangement requires a carrier device for supplying cartridges from the cartridge housing to the rotary table type printing device. Such a carrier device has to be capable of supplying cartridges discharged from the cartridge housing onto the table of the photoprinting device.

An object of this invention is to provide a carrier device which can receive film-containing cartridges supplied from a lateral direction and send them continuously into a photoprinting device, and which can return the cartridges back into the original position after the films have been printed and wound into the respective cartridges.

Another object is to provide a carrier device which operates basically mechanically.

SUMMARY OF THE INVENTION

According to this invention, there is provided a carrier device for use with a photoprinting device and including a carriage for holding and transporting cartridges accommodating films to a photoprinting device, a guide unit provided along a passage for guiding the carriage, and a drive means for reciprocating the carriage along the passage, the guide unit having a cartridge supply portion for supplying the cartridge to the carriage, the carriage having an arm which is movable between a closed position in which the cartridge is held in position in the carriage and an open position in which the cartridge is detachable from the carriage.

The carriage preferably comprises a cartridge retaining mechanism comprising a support plate and the arm for holding the cartridge, and an arm locking mechanism for moving and locking the arm to and in the closed position through the cartridge retaining mechanism.

The cartridge supply portion preferably has a cartridge insert portion through which the cartridge can be manually inserted into the passage.

In the present invention, when a cartridge containing a film is supplied from a lateral direction, it is retained in the carriage by its arm, and is fed to the photoprinting device along the passage. The cartridge can be supplied reliably and safely to the printing machine without the possibility of damaging the film inside because the film need not be taken out of the cartridge. After the film has been printed and wound back into the cartridge, the cartridge is sent back along the same passage to the cartridge housing device.

According to the present invention, the carriage has the cartridge retaining mechanism and the arm locking mechanism. The cartridge is held in position by the arm by locking the arm. By unlocking the arm, the cartridge becomes detachable from the carriage. The cartridge thus detached from the carriage is fed into the printing device. The carriage is entirely made up of mechanical parts. Electrical means are used only to move the carriage back and forth. The entire structure is thus extremely simple and automated.

According to the present invention, it is possible to manually feed any extra cartridge into the carriage through the cartridge insert portion, while interrupting the normal cartridge supply process.

Other features and objects of the present invention will become apparent from the following description made with reference to the accompanying drawings, in which:

BRIEF DESCRIPTION OF THE DRAWINGS

FIGS. 6A–8B are sectional and schematic views illustrating the basic operation of the same in different states thereof;

DETAILED DESCRIPTION OF THE PREFERRED EMBODIMENT

With reference now to the drawings, an embodiment of this invention will be described.

A carrier device B is used to carry film-accommodating cartridges supplied from a cartridge housing device A for continuously supplying a plurality of such cartridges housed therein to a rotary table for photoprinting. Thus, device B is provided immediately before a photoprinting device C.

The cartridge housing device A shown has a cartridge housing case 101 and a pair of sprockets 102 mounted in the case 101. An endless belt 103 extends around the sprockets 102. Belt 103 has a plurality of recesses on the outer surface thereof to receive cartridges X therein so that the cartridges can circulate in the case 101.

Figure 2:
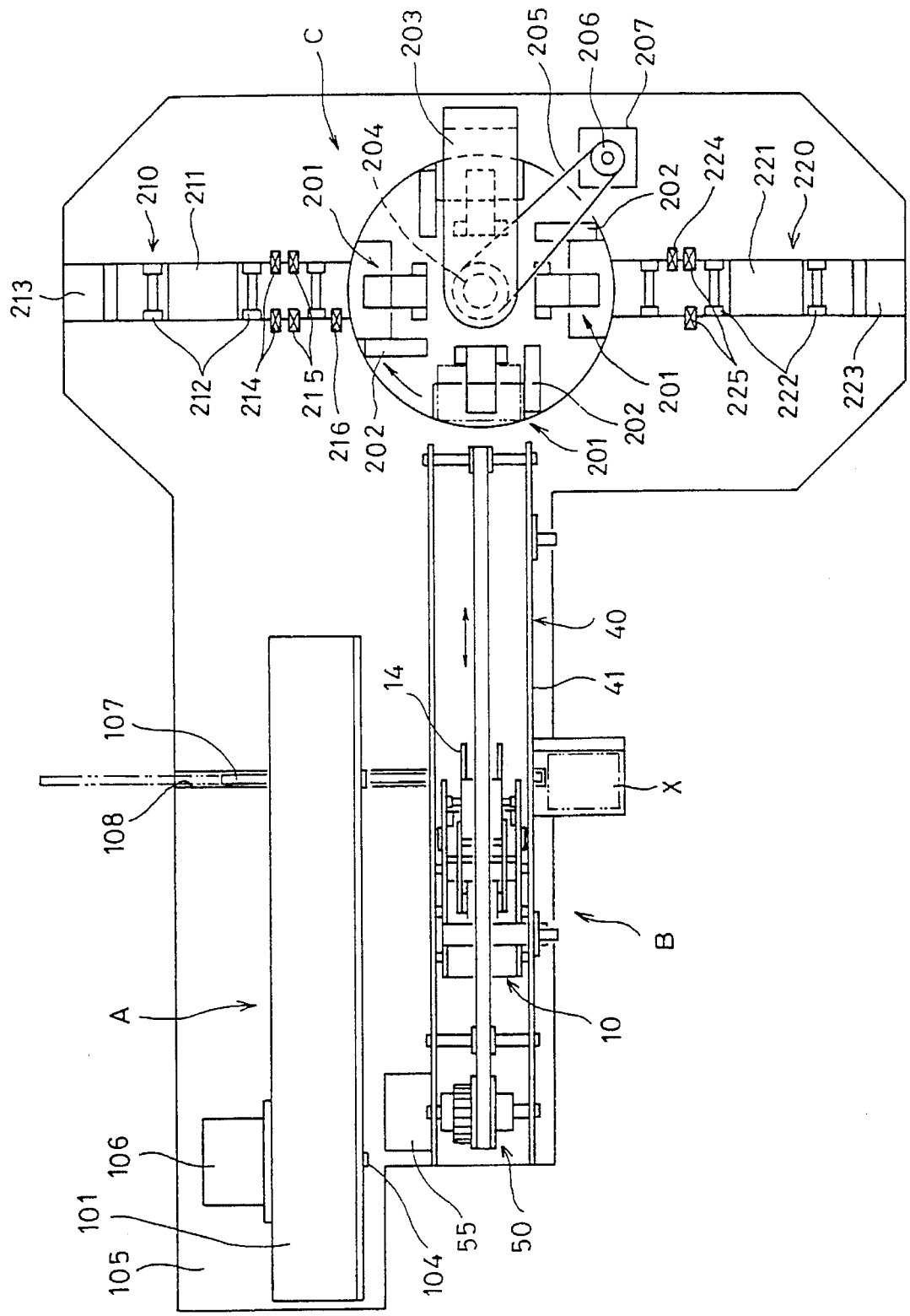
FIG. 2 is a plan view of the same.

One of the sprockets 102 is mounted on a rotary shaft 104 having opposite ends protruding from the side walls of the cartridge housing case 101. As shown in FIG. 2, the rotary shaft 104 is connected to the output shaft of a motor 106 mounted on a common base 105. Thus, the sprockets 102 and the belt 103 are driven by the motor 106.

A plurality of cartridges X are manually put into the case 101 (by opening one side of the case) with the cartridge housing device A remote from the common base 105(A). Then, the device A is set on the common base with one of sprockets 102 on the rotary shaft 104.

As shown in FIG. 2, the common base is formed with a transverse groove 108 in which is provided a lever 107 slidable along the groove 108. By holding one of the cartridges X in the device A with the lever 107 and pushing it toward the carrier device B, the cartridges can be fed to the device B one by one.

Figure 1:
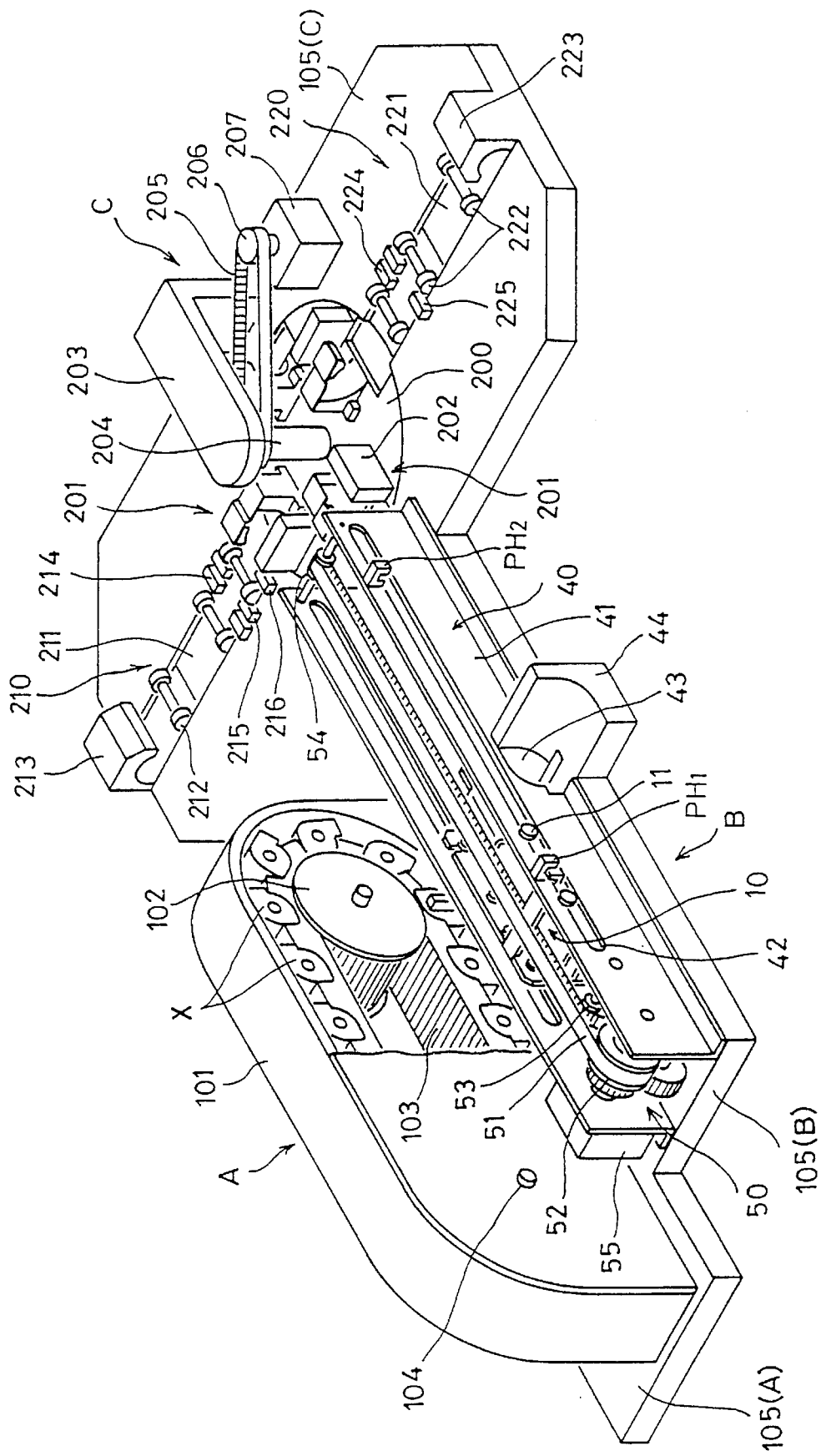
FIG. 1 is a perspective view of an entire carrier device of a first embodiment.

As shown in FIGS. 1 and 2, the carrier device B is provided parallel to the cartridge housing device A. Namely, cartridges X are fed into the carrier device from its side. The carrier device B is described in detail below.

The photoprinting device C is basically the same in structure as that disclosed in the above-mentioned Japanese Patent Application 5-178133, which is briefly describe below. The photoprinting device C is mounted on a common base 105(C) which extends in a direction perpendicular to the direction in which cartridges are fed in the carrier device B. It includes a rotary table 200, a scanner assembly 210 and a printing/exposure unit 220.

The rotary table 200 is rotatably mounted in the common base 105(C) so that its top surface is flush with the top surface of the common base. The table 200 carries four cartridge receptacles 201 provided at equal angular intervals of 90° and each capable of supporting one cartridge. Each cartridge receptacle 201 has at its end a cartridge fixing member 201a (FIG. 6A) for holding a cartridge in position in the receptacle. Also, a driving unit 202 is provided on one side of each receptacle 201 to open and close the lid at the film inlet/outlet of the cartridge, to feed the film out of the cartridge or insert it therein. (Its detailed mechanism is not shown.)

Further, the rotary table 200 of this embodiment has a support shaft 204 rotatably mounted on a support arm 203. An endless belt 205 extends around the support shaft 204 and a pulley 206 of a motor 207. Thus, the rotary table 200 is rotated by the motor 207.

Alternatively, the driving force of the motor 207 may be transmitted to the rotary table 200 through a gear train provided under the table.

The scanner assembly 210 and the printing/exposure means 220 are mounted on the common base 105(C) along its longitudinal center line. Under a scanner opening 211 of the scanner assembly 210 is a light source (not shown). A scanner unit is provided over the scanner opening 211 to read image data on each frame of a film by illuminating it when each frame has stopped over the scanner opening.

The film rolled out of each cartridge receptacle 201 is fed by feed rollers 212 and wound into a film winder 213. While being fed toward the winder 213, image data are read by the scanner assembly 210, while other data are read by a bar code detector 214, a magnetic head 215 and a perforation detector 216. When all the necessary data for one film are read by these members, it is rewound back into the cartridge X and the cartridge is moved to the next step by rotating the rotary table 200.

Another light source is provided under an exposure opening 221 of the printing/exposure means 220 provided across from the scanner assembly 210. The images on each film are printed onto a photosensitive material (not shown) being fed over the opening 221 by directing light from the light source.

The film rolled out of each cartridge receptacle 201 is fed by feed rollers 222 and wound into a film winder 223. While being fed, the images on the film are exposed and printed by the printing/exposure means 220. Along the feed path, a perforation detector 224 and a magnetic head 225 are provided.

Now referring also to FIG. 3 and the following figures, the carrier device B for supplying cartridges X from the cartridge housing device A to the photoprinting device C will be described in detail.

As shown in FIGS. 1 and 2, the carrier device B comprises a carriage 10, a guide 40 for guiding the carriage 10 and a driving unit 50 for driving the carriage 10.

Figure 4:
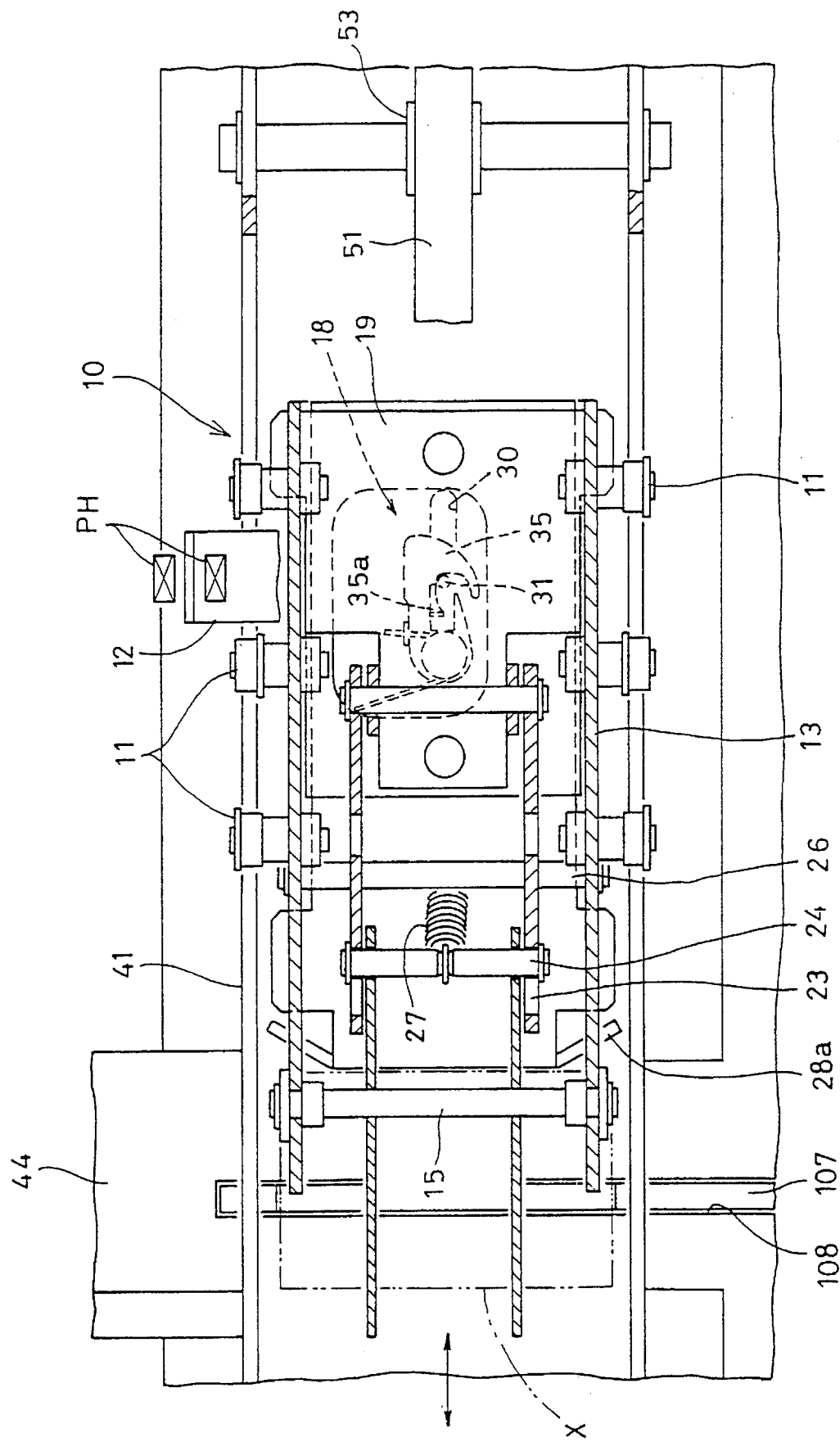
FIG. 4 is a plan view of the same.

As shown in FIGS. 1 and 2, the guide 40 comprises upright side plates 41 provided on the common base 105(B) and extending in the direction in which the carriage 10 is moved to guide the carriage 10. Each side plate 41 has a longitudinally elongated guide opening 42 near its top edge. The carriage 10 is slidable along the side plates with guide rollers 11 engaged in the respective guide openings 42. The carriage 10 also has a position detecting lever 12 inserted in the guide openings 42 (FIG. 4). Photoelectric sensors PH1 and PH2 are provided along the guide openings to detect the position of the lever 12 and thus the carriage 10. The position detecting lever 12 will be described in detail below.

The guide plates 41 have openings 43 at substantially the longitudinal center thereof (FIG. 1). They are large enough to allow passage of a cartridge. FIG. 1 shows the opening 43 on one side only. Numeral 44 designates a cartridge inserting member. It is used when it is necessary to manually insert an extra cartridge into the carrier device B. After processing, such a cartridge is pushed out from the member 44 by the lever 107.

Figure 3:
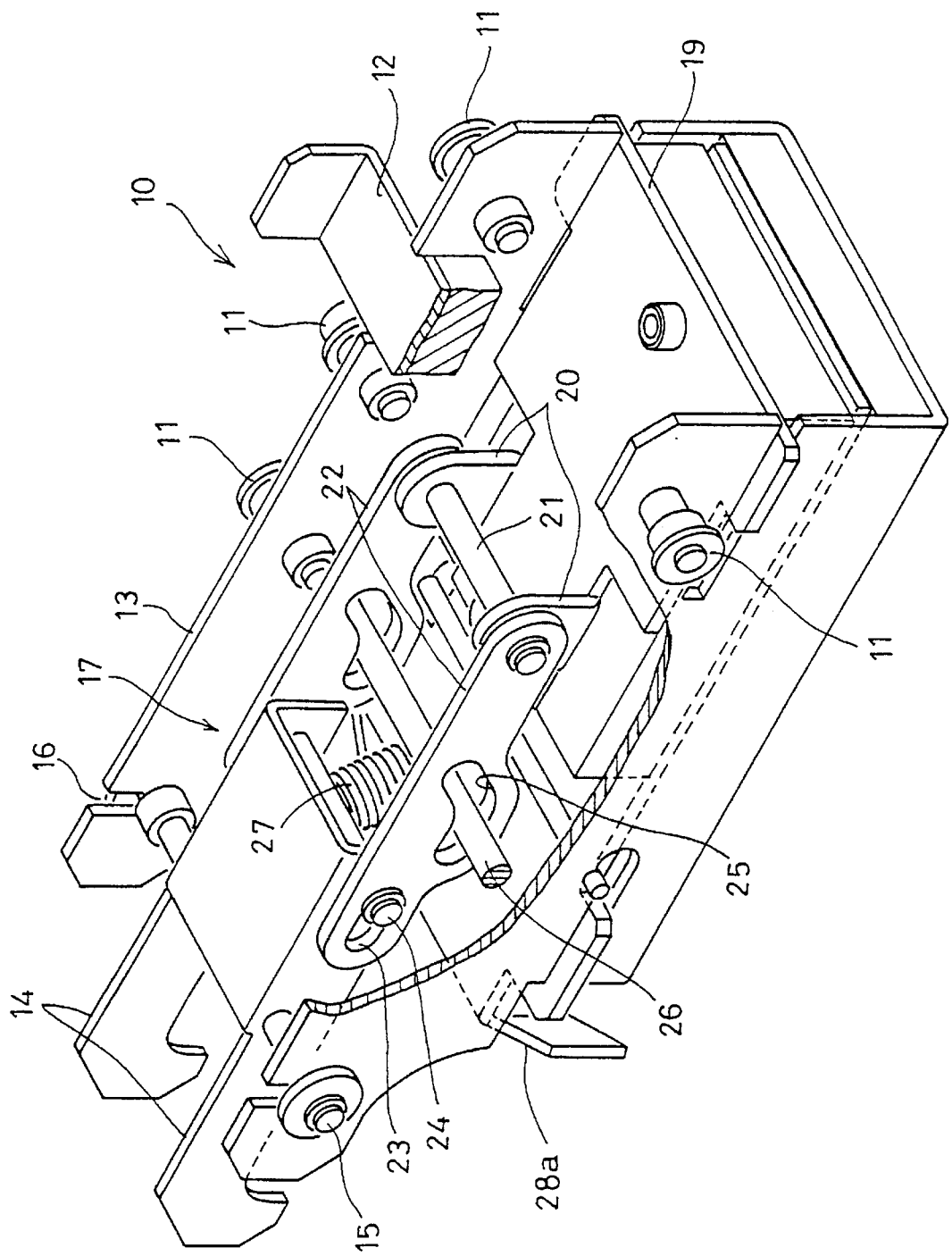
FIG. 3 is a perspective view of a carriage of the first embodiment.

As shown in FIG. 3, the carriage 10 includes a case 13 having a C-shaped section. The guide rollers 11 are provided at predetermined intervals on both sides of the case 13 near its top. As described above, they engage in the guide openings 42 formed in the side plates 41.

In the carriage 10, arms 14 for supporting a cartridge X are mounted. A horizontal support pin 15 secured to the arms 14 fits in grooves 16 formed in the case 13. The arms 14 are thus pivotable about the horizontal pin 15 between open and closed positions.

A cartridge retaining mechanism 17 for holding a cartridge in position is connected to the bases of the arms 14. Under a horizontal support plate 19, there is provided an arm locking mechanism 18 for locking the arms in their closed position through the cartridge retaining mechanism 17.

As shown in FIG. 3, the support plate 19 has substantially a T-shape and is provided with lobe members 20 extending vertically from both sides of the leg of T (at the end near the arms thereof). The lobe members 20 support a horizontal pin 21 which in turn supports the rear ends of bending levers 22. The levers 22 have elongated holes 23 in the front ends through which a pin 24 extends. Thus, the levers 22 are connected to the arms 14 through the pin 24. The bending levers 22 also have L-shaped elongated holes 25 in the central portions thereof. A support pin 26 extends through the holes 25.

The support pin 26 is fixed to side plates of the case 13. The bending levers 22 are thus movable back and forth and/or pivotable about the pin 21 while being supported on the support pin 26. The arms 14 are always pulled by a spring 27 which engages the pin 24. In the state shown in FIGS. 3–5, the bending levers 22 are maintained in their horizontal position by the support pin 26 against the pulling force of the spring 27.

Figure 5:
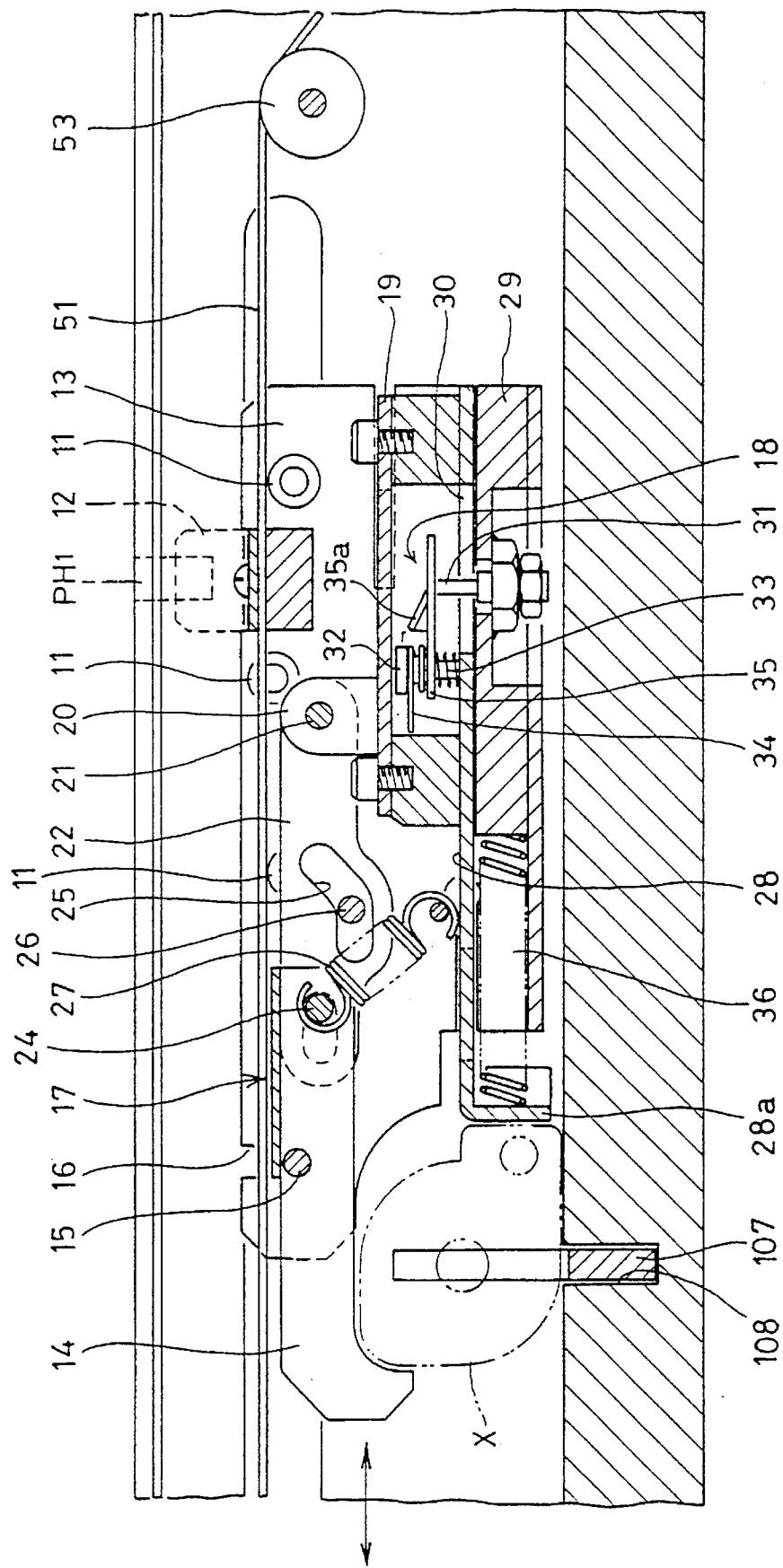
FIG. 5 is a partial sectional view of the same.

As shown in FIGS. 4 and 5, the arm locking mechanism 18 provided under the support plate 19 is mounted on a horizontally movable support plate 28 which is slidable in a direction of the arrow on a base plate 29 fixedly mounted on the bottom plate of the case 13. The arm locking mechanism 18 is supported by tightening a nut received in a recess formed in the bottom of the case 13 and the base plate 29 (FIG. 5). It includes a vertical pin 31 inserted in an elongated hole 30 formed in the horizontally movable support plate 28, another vertical pin 32 extending vertically from the support plate 28, and a hook 35 elastically supported by a spring 33 so as to be movable vertically within the length of the pin 32 and urged by a spring 34 so as to be rotatable about the pin 32.

An unlocking member 35a is provided inside the bent portion of the hook 35 as viewed from the top as shown in FIG. 4. It serves to release the hook 35 locked to the pin 31 (FIG. 4 shows the locked state). As shown in FIG. 4, the unlocking member 35a has a portion protruding obliquely inward as viewed from the top. Also, as shown in FIG. 5, its end is raised obliquely.

The horizontally movable support plate 28 has an L-shaped front end 28a. A spring 36 is mounted in a space defined between the L-shaped front end 28a and the base plate 29. As shown in FIG. 4, the front end 28a is slightly bent laterally outward as viewed from the top to allow smooth insertion of a cartridge X.

The carriage 10 is driven by the driving unit 50 shown in FIGS. 1 and 5 through an endless belt 51. As shown in FIG. 1, the belt 51 extends around a pulley 52 of a motor 55, an intermediate tension adjusting roller 53, and a roller 54 at the other end.

As shown in FIG. 5, the belt 51 is coupled to the base of the position detecting lever 12, which extends through the top of the case 13 of the carriage 10 in a transverse direction so as to cross the belt. Thus, the carriage 10 can be moved back and forth by moving the belt 51.

The operation of this embodiment now will be described with reference first to FIGS. 4–8.

In the state shown in FIGS. 4 and 5, a cartridge X supplied from the cartridge housing device A is held between the arms 14 and the front end 28a of the horizontally movable support plate 28. FIG. 6A shows the state in which the cartridge X has been transferred into one of the cartridge receptacles 201 on the rotary table 200 in the photoprinting device C.

In order to hold the cartridge X more reliably in the carriage, the arms 14 and the horizontally movable support plate 28 should be arranged so that the cartridge X shown in FIG. 5 can be moved laterally into between the arms 14 and the front end 28a of the support plate 28 without slightly pushing back the front end 28a.

FIG. 6A shows the moment at which the cartridge X has abutted the cartridge receptacle 201. Thereafter, the carriage 10 is pushed further left from this position under the driving force transmitted from the belt 51. In this state, as shown in FIG. 6B, the hook 35 of the arm locking mechanism 18 remains in engagement with the pin 31, keeping the arms 14 locked in the closed position.

When the carriage 10 is pushed leftwardly from the position shown in FIG. 6A, the arms 14 are moved leftwardly. But since the cartridge X is now caught in the cartridge receptacle 201, the horizontally movable plate 28, whose front end 28a is abutting the cartridge X, cannot move together with the remaining parts of the carriage.

Thus, the spring 36 mounted between the front end 28a and the base plate 29 is compressed. This is because the case 13 and the base plate 29 are integral while the horizontally movable support plate 28 is movable in the case 13.

Figure 7A:
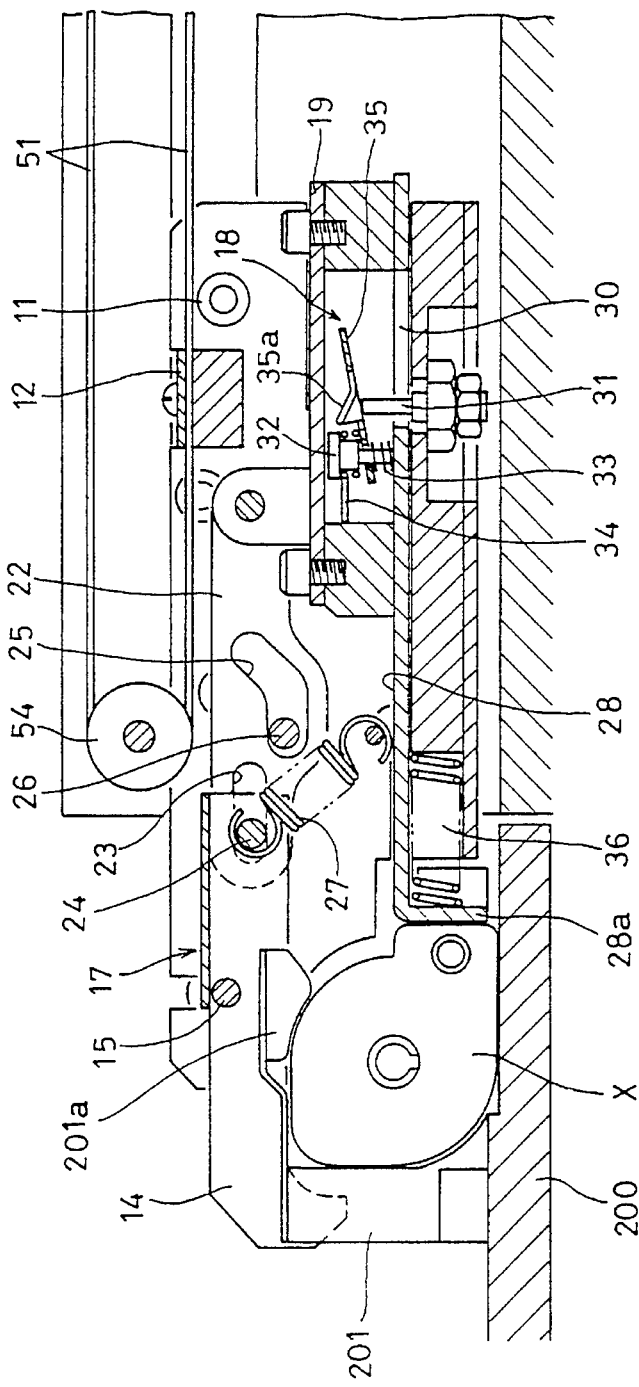
Figure 7B:
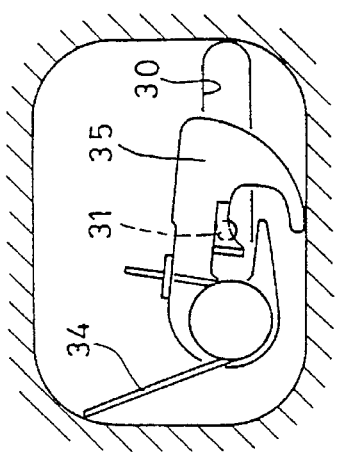

When the case 13 moves relative to the horizontally movable support plate 28, the pin 31 of the arm locking mechanism 18 moves relative to the hook 35, thus raising the hook 35 obliquely through the unlocking member 35a as shown in FIG. 7A. Since the force of the spring 34 is acting on the hook 35, the unlocking member 35a rides upon the top end of the pin 31 as shown in FIG. 7B. The hook 35 is now almost unlocked.

In this state, the bending levers 22 are still kept aligned with the arms 14 by the support pin 26. When the belt 51 is moved rightwardly, the arms 14 will abut the cartridge X again, while the front end of the horizontally movable support plate 28 is kept abutting the cartridge X. Since the base plate 29 is moved rightwardly together with the case 13, the spring 36 expands.

As the base plate 29 moves rightwardly and the spring 36 expands, the pin 31 moves back in a straight line, completely releasing it from the hook 35. At the same time, the support pin 26 moves past the bend point of the elongated bent holes 25 of the bending levers 22, so that the support pin 24 and thus the rear ends of the arms are pulled downward by the spring 27. As the pin 24 is engaged in the elongated holes 23 formed in the front ends of the bending levers 22, the front ends of the bending levers 22 are also pulled downward. The levers 22 and the arms 14 are thus bent as shown in FIG. 8A. The arms 14 thus separate from the cartridge X.

The manner in which a plurality of cartridges X are fed continuously with the carriage 10 now will be described with reference to FIGS. 9 and 10.

Figure 9A:
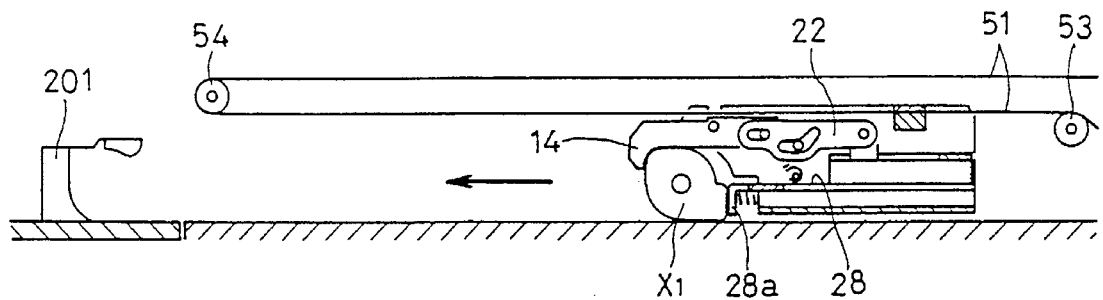
FIGS. 9A–10G are schematic views showing the flow of movements of cartridge during operation thereof.

FIG. 9A shows the state in which a cartridge X1 has been received from the cartridge housing device A at the cartridge loading or supply position. In this example, the cartridge X1 has been received with the arms 14 of the carriage 10 closed. But the arms 14 do not necessarily have to be kept closed when loading a cartridge.

Preferably however, they are kept closed when loading a cartridge, because if a cartridge is loaded with the arms opened (bent), the cartridge has to be fed twice (this will be explained later). This leads to reduced efficiency. The arms 14 can be set freely at the open or closed position when initially setting the device simply by pushing the front end 28a of the horizontally movable support plate 28.

As shown in FIG. 9A, after loading the cartridge X1, the belt 51 is driven to move the carriage 10 and thus the cartridge X1 in the direction of the arrow.

Figure 9B:
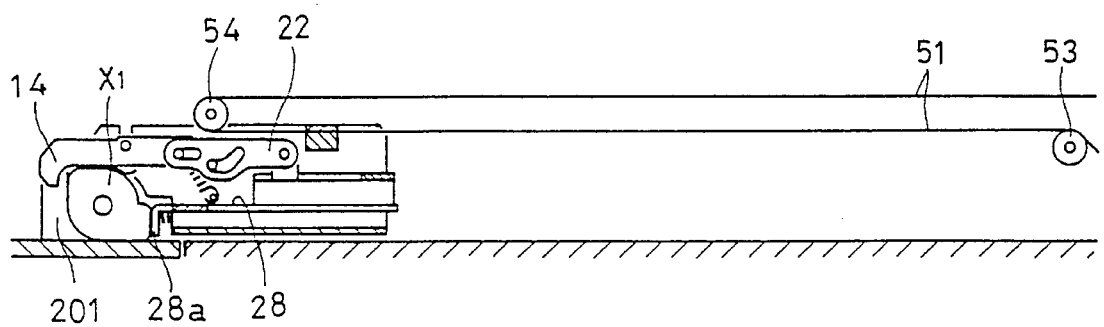
Figure 9C:
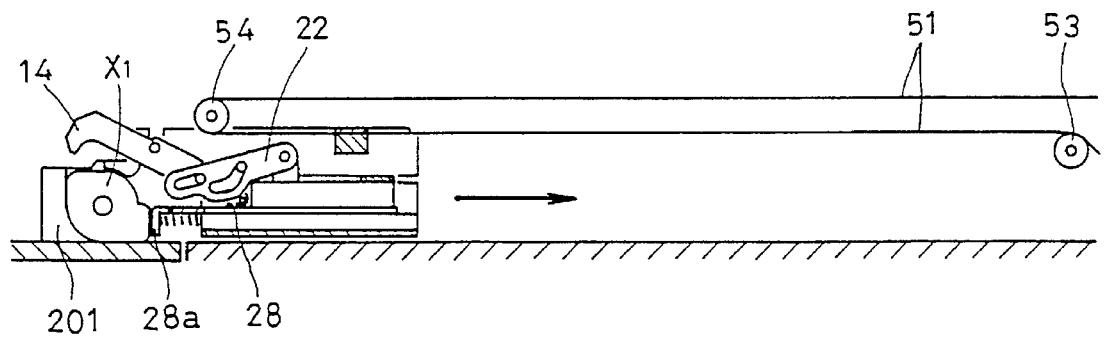
Figure 9D:
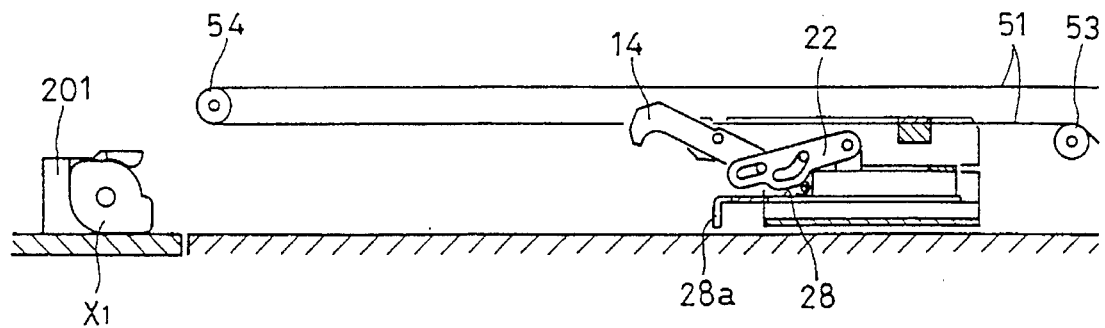

As shown in FIG. 9B, when the cartridge X1 has arrived at a transfer position and abuts the cartridge receptacle 201 of the rotary table 200, only the support plate 28 stops moving, while the case 13 keeps moving leftwardly while compressing the spring 36, thereby releasing the arm locking mechanism 18. As shown in FIG. 9C, when the carriage 10 begins moving backward after the arm locking mechanism 18 has been released, the arms 14 are opened and separate from the cartridge X1. As shown in FIG. 9D, the carriage moves backward, leaving the cartridge X1 in the cartridge receptacle 201.

Figure 10E:
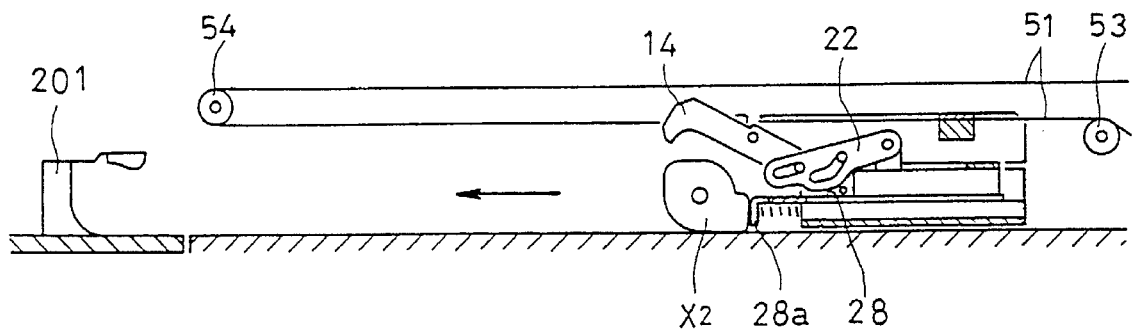

Then, as shown in FIG. 10E, the carriage 10 receives another cartridge X2 at the loading position with the arms 14 opened. Since this operation is carried out automatically, it is impossible to close the arms 14.

Figure 10F:
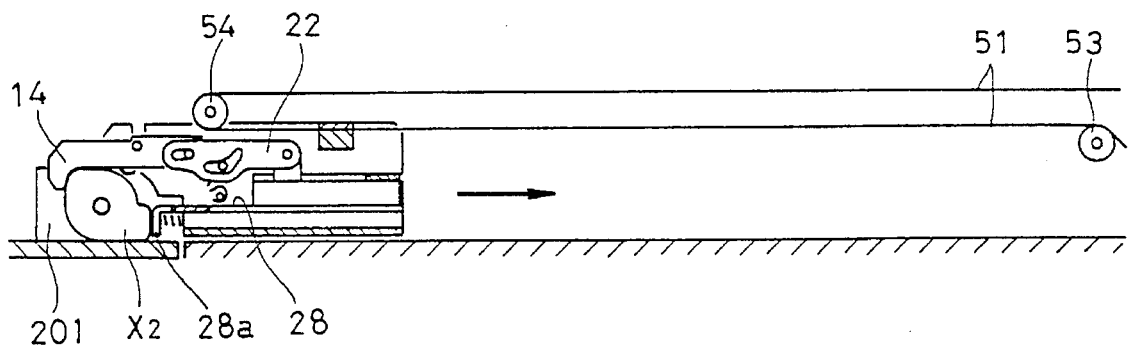

The cartridge X2 is moved to the cartridge receptacle 201, pushed by the front end 28a of the horizontally movable support plate 28. As shown in FIG. 10F, when the cartridge X2 abuts the cartridge receptacle 201, the spring 36 is compressed by being pushed by the front end 28a of the support plate 28, so that the arm locking mechanism 18 is locked again. At the same time, the arms 14 return to their horizontal position, engaging the cartridge X2 again.

Figure 10G:
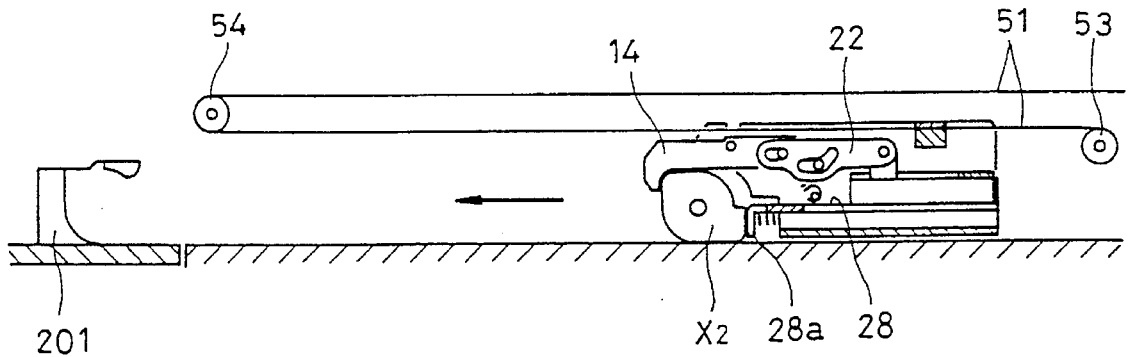

Thus, it is necessary again to move the carriage back to the original position and then move it forward, i.e. in the direction of the arrow in FIG. 10G. The operation thereafter is exactly the same as the operation for the first cartridge X1. The second cartridge X2 is thus delivered to the cartridge receptacle 201.

In the illustrated example, the cartridge X2 is moved back to the original position as shown in FIGS. 10F and 10G. But the cartridge does not have to be moved back to the loading position but may be moved only slightly to the right from the position shown in FIG. 10F, i.e. the position where the arms are closed, and then the cartridge may be moved back into abutment with the cartridge receptacle 201 to open the arms.

It will be needless to say that by the time the operation shown in FIGS. 10E and 10F begins, the rotary table 200 is turned by a predetermined angle so that the first cartridge X1 is moved to the next station. Namely, the receptacle 201 shown in FIGS. 10E–10G is the one next to the receptacle 201 shown in FIGS. 9A–9D.

After setting the second cartridge X2 in the second receptacle, third and fourth cartridges are supplied into the third and fourth receptacles in exactly the same manner as with the second cartridge X2. The rotary table of this embodiment carries only four cartridge receptacles. Thus, before supplying a fifth cartridge X5 onto the table, the first cartridge X1 has to be removed from the rotary table 200.

After supplying the fourth cartridge X4 onto the table, the carriage 10 moves back to the loading position with its arms 14 opened. Then, the carriage is moved forward again without loading the fifth cartridge X5 and with the arms 14 opened. Immediately before, the table is turned so that the first cartridge X1 is brought to the end of the path of the carriage.

When the carriage 10 abuts the cartridge X1, the arms 14 are closed to hold the cartridge X1. The carriage is then brought back to the original position, where the cartridge X1 is discharged from the carriage and moved back into the cartridge housing device A. Then, the fifth cartridge X5 supplied from the cartridge housing device A is loaded into the carriage. The carriage 10 is then moved to set the cartridge X5 in the receptacle 201.

Sixth and subsequent cartridges X6 . . . are fed to the respective receptacles in the same manner as with the cartridge X5.

Figure 11:
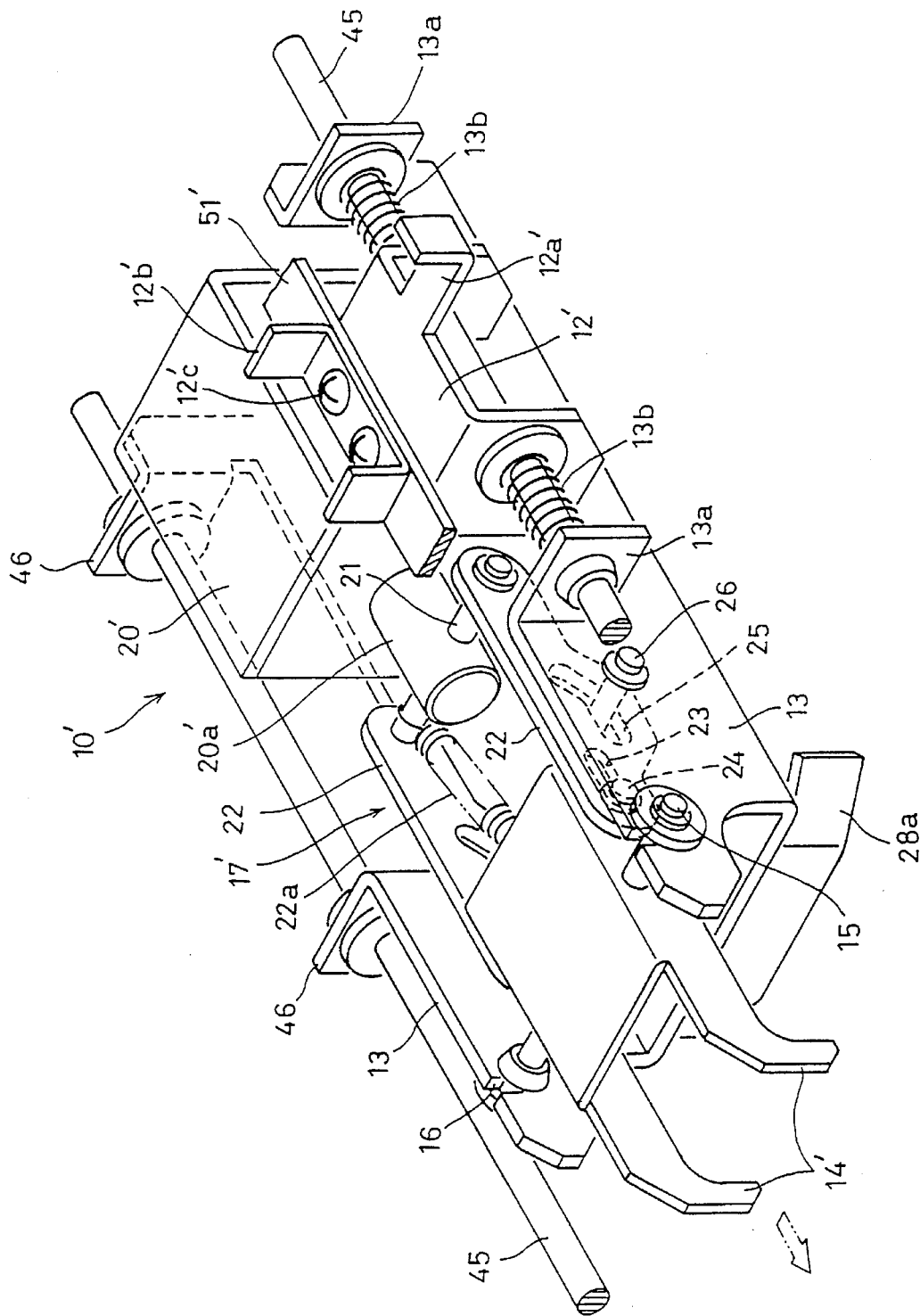
FIG. 11 is a perspective view of the carriage of a second embodiment.

FIG. 11 and the subsequent figures show a carrier device B' of a second embodiment. Similar to the first embodiment, the carrier device B' comprises a carriage 10', a guide unit 40' and a driving unit 50. The driving unit 50' is exactly the same as that of the first embodiment. The carriage 10' and the guide unit 40' are somewhat different from those of the first embodiment.

Figure 12:
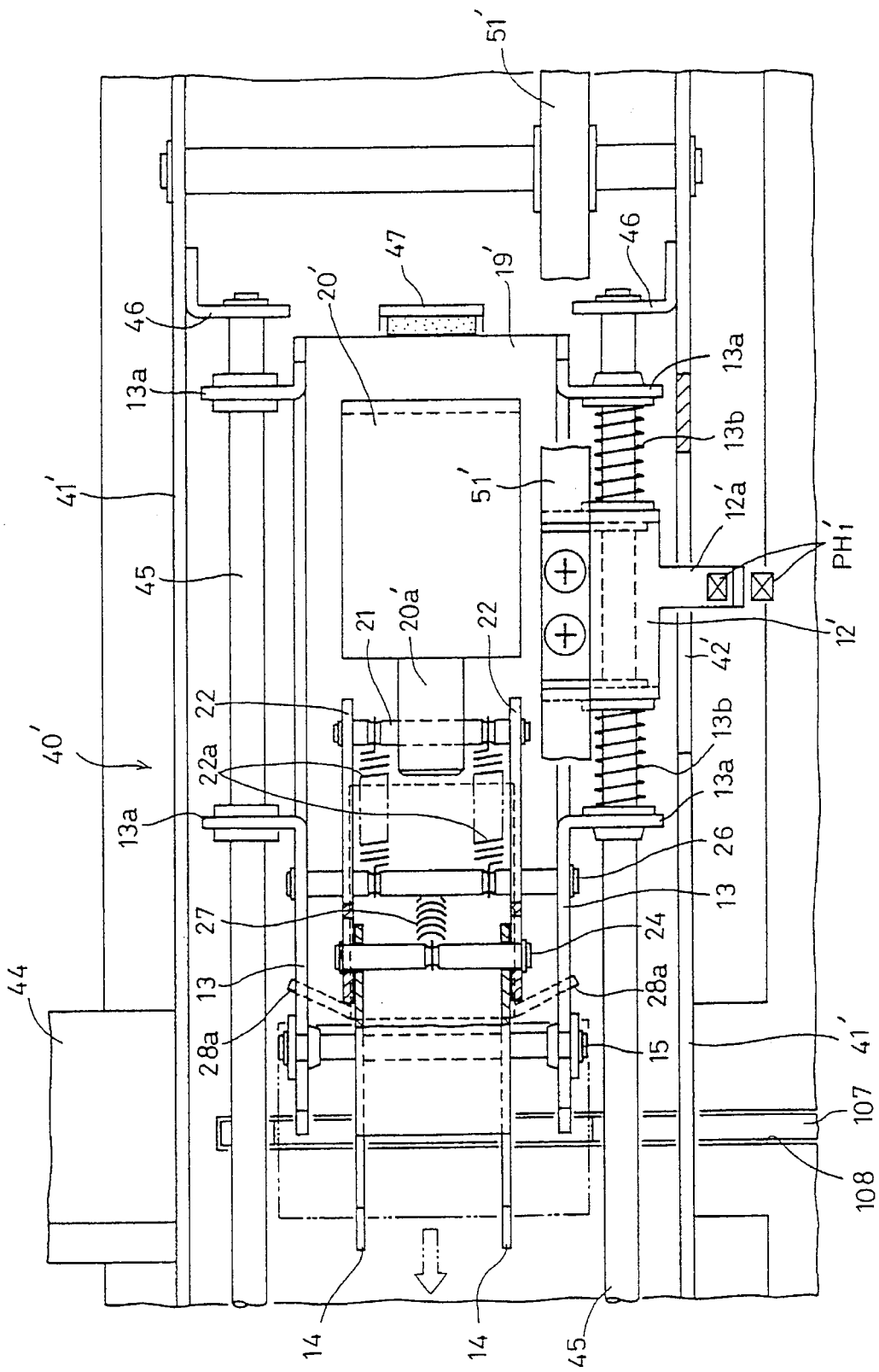
FIG. 12 is a plan view of the same.

Similar to the first embodiment, the guide unit 40' has guide plates 41' (see FIG. 12 and not shown in FIG. 11 to simplify illustration), and guide rods 45 supported by guide supports 46 and extending parallel to the guide plates 41'. Numeral 47 indicates a stopper for mechanically stopping the carriage 10'.

Unlike the first embodiment, the carriage 10' has no guide rollers 11. Instead, the case 13 has outwardly bent portions 13a provided at both ends of cutouts formed in the side plates of the case and slidably supported on the guide rods 45. A driving plate 12' is fixedly mounted on the bottom plate 19' of the case 13 between the bent portions 13a on the lefthand side of the carriage 10' with respect to the direction of movement of the carriage (direction of the arrow in FIG. 11). Springs 13b are mounted on the guide rod 45 extending through the driving plate 12' between the front and rear bent portions 13a and the driving plate 12'.

The springs 13b are provided to absorb any shock that may be produced when the carriage 10', driven by the belt 51', or the cartridge X thereon hits the stopper 47 or the receptacle 201 at the front and rear ends of the feed path. The belt 51' is secured to the top end of the driving plate 12' by means of a fastening plate 12b' and screws 12c'.

Arms 14' are pivotally mounted on the case 13 near its front end through a horizontal support pin 15. A cartridge retaining mechanism 17' is connected to the base of the arms 14' through a pin 24. The device of this embodiment has no arm locking mechanism.

The case 13 carries a solenoid driving unit 20' (hereinafter simply referred to as "solenoid") near its rear end. Its driving rod 20a' is connected to the cartridge retaining mechanism 17' through a pin 21. The cartridge retaining mechanism 17' comprises levers 22, a support pin 26 inserted in elongated holes 25 formed in the central portion of the levers 22 to tilt the levers 22, and springs 22a engaging the pin 26.

The cartridge retaining mechanism 17' has its front end connected to the base of the arms 14' through the pin 24. A spring 27 is connected to the pin 24 to pull the base of the arms 14 downward at all times. A front end plate 28a is fixed to the front end of the bottom of the case 13.

Figure 13:
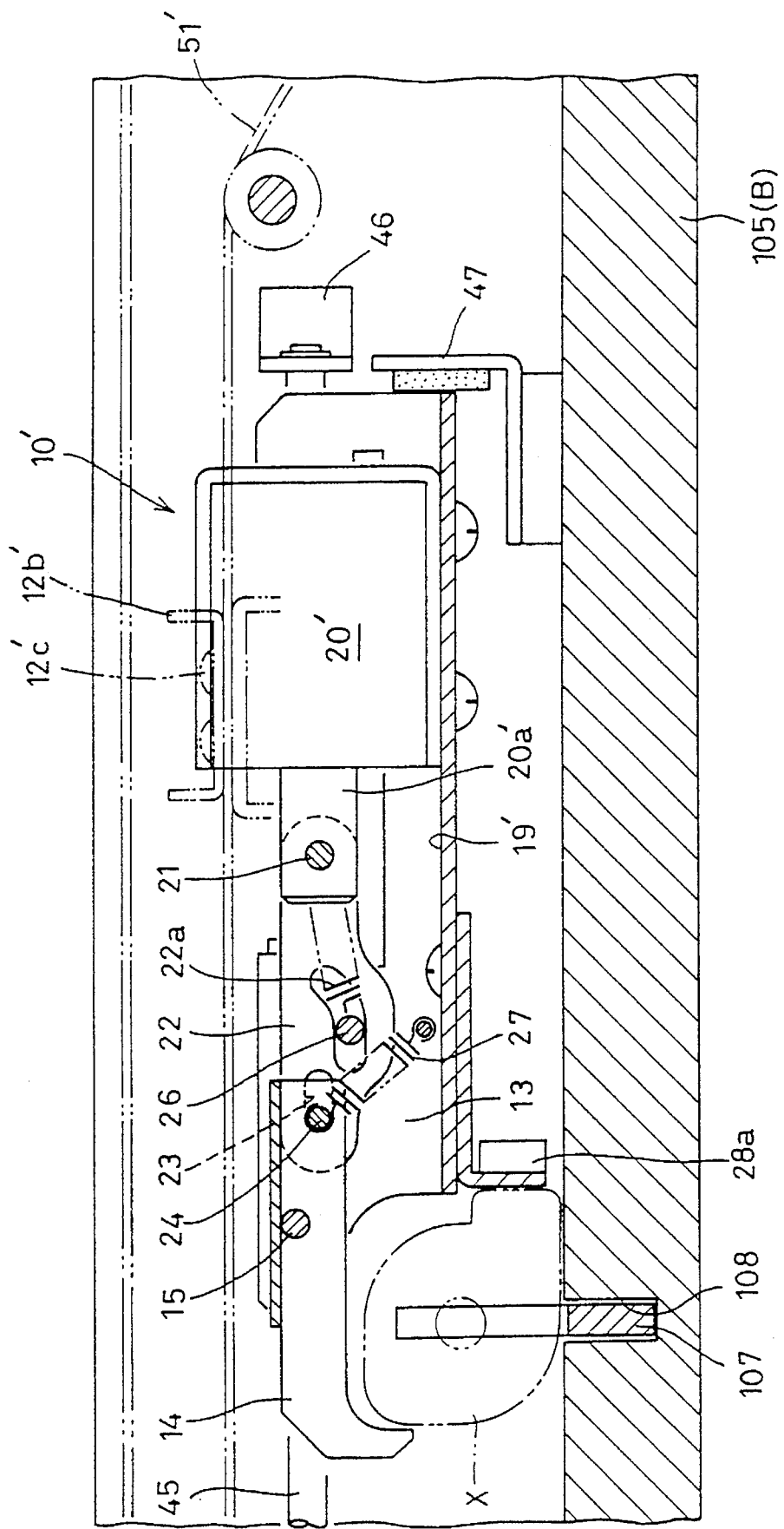
FIG. 13 is a sectional view of the same.

The operation of the carrier device B' of this embodiment is basically the same as that of the first embodiment. FIG. 13 shows the carriage 10' loaded with a cartridge X in the cartridge loading position. The cartridge X is set and held between the arms 14 and the front end plate 28a by opening the arms immediately before loading the cartridge X and closing them after loading the cartridge as shown.

The arms 14 can be opened and closed by moving the driving rod 20a' of the solenoid 20'. In the state shown in FIG. 13, the driving rod 20a' is fully retracted, so that the arms 14 and the levers 22 are kept horizontal.

The carriage 10' is driven forward by the driving unit 50 through the belt 51' while holding the cartridge X between the arms 14 and the front end plate 28a to deliver the cartridge X to the cartridge receptacle 201 on the rotary table 200.

When the cartridge X abuts the cartridge receptacle 201, the carriage 10's stops there.

Figure 14:
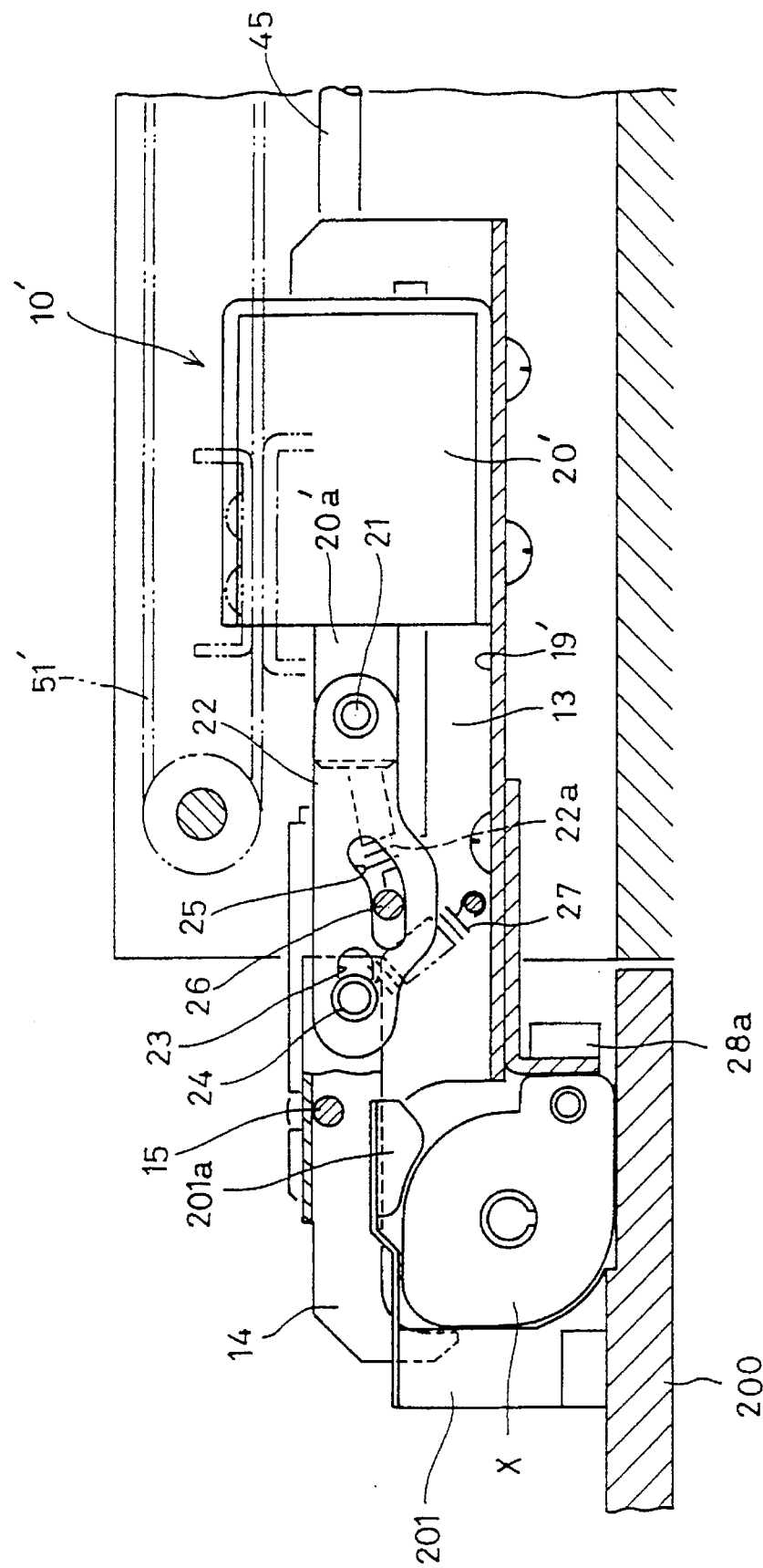
FIGS. 14 and 15 are sectional views showing operation thereof.

But since the belt 51' is still being driven at this moment, it pushes the driving plate 12' a little more ahead against the biasing force of the springs 13b and stops a moment later. This is because an unillustrated photoelectric sensor PH2 detects the carriage 10' and produces a signal for stopping the motor 50. This state is shown in FIG. 14.

Figure 15:
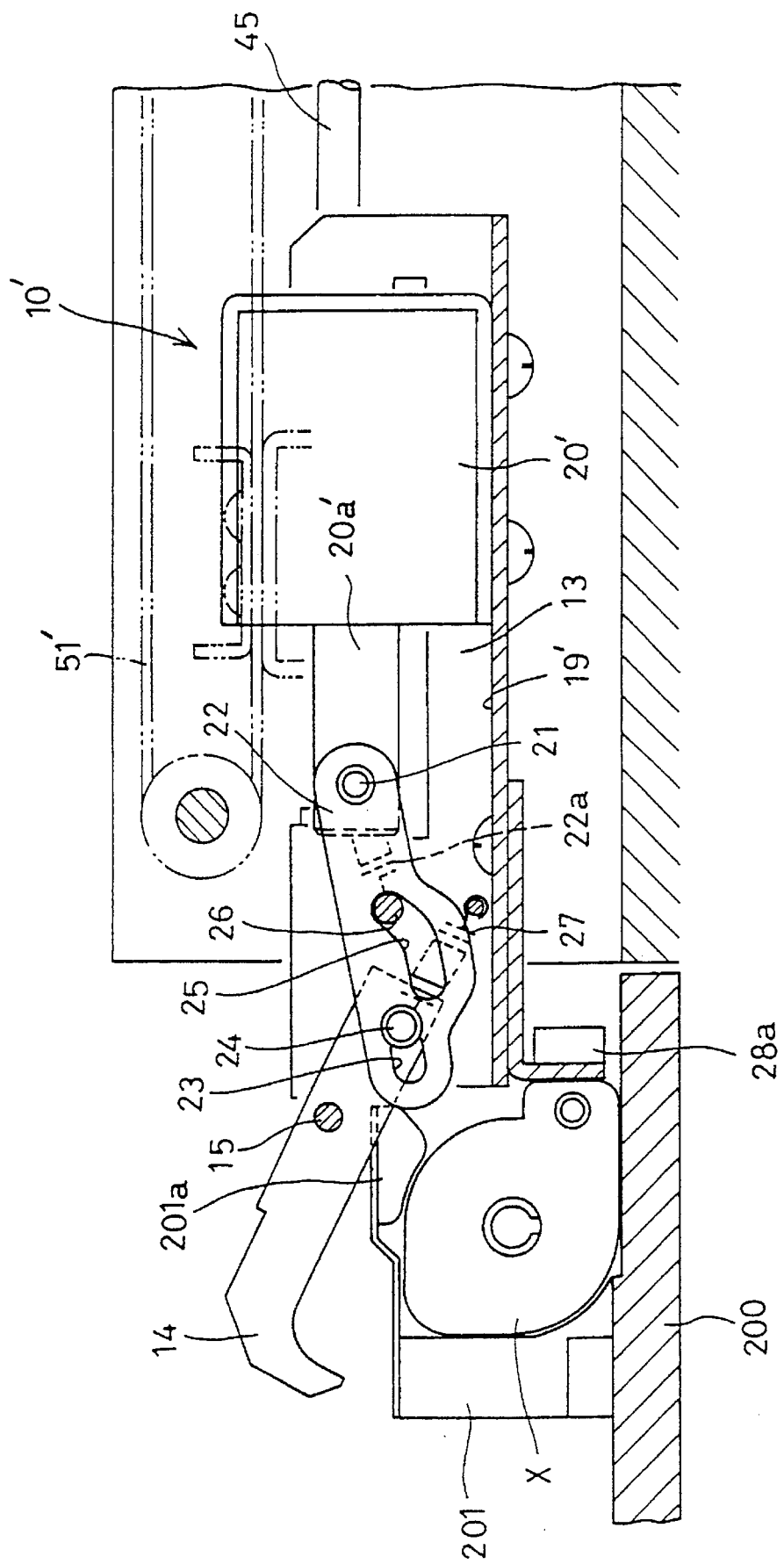

When the carriage 10' stops, the solenoid 20' is activated to push out the driving rod 20a' and to release the arms 14 as shown in FIG. 15. More specifically, when the driving rod 20a' is pushed out, the pin 21 and the tilting levers 22 are pushed, leaving the pin 26 at the rear end of the elongated hole 26. As a result, the front end of the levers 22 drop, so that the arms 14 are pulled downward at their rear ends by the spring 27. The arms 14 thus pivot about the pin 15 to their open position.

In this state, the cartridge X is not bound by the arms 14 any more. Thus, by backing up the carriage 10', the cartridge X is left on the rotary table 200. The carriage 10 is brought back to its original cartridge loading position shown and stops by abutting the stopper 47 as shown in FIG. 13. A photoelectric sensor PH1 is provided at the loading position to detect the carriage 10' and produce a signal for deactivating the motor 50. A cartridge X is loaded on the carriage with the arms 14 opened. Then, the arms 14 are closed. This state is shown in FIG. 13. Then, second and third cartridges are fed in the manner as described above.

This embodiment differs from the first embodiment in that the arms 14 are opened and closed not by the driving unit for driving the carriage 10 but by the separate solenoid 20'. Thus, this embodiment is simpler in structure and thus more reliable, simpler and more efficient in operation than the first embodiment.

What is claimed is:

1. A carrier device for transporting a film cartridge to a photoprinting device, said carrier device comprising:

a guide unit defining a passage to be directed toward the photoprinting device;

a carriage guided by said guide unit for movement along said passage between a cartridge supply position, whereat a cartridge can be supplied to said carriage, and a transfer position, whereat the thus supplied cartridge can be transferred to the photoprinting device;

drive means for reciprocating said carriage along said passage; and said carriage including a carriage body, a support plate mounted on said carriage body so as to be movable relative to said carriage body toward and away from a cartridge set in said carriage, a spring mounted between said support plate and said carriage body and biasing said support plate toward the cartridge set in said carriage, an arm mounted for movement between a closed position, whereat the cartridge is held between said arm and said support plate, and an open position, whereat the cartridge is detachable from said carriage, and a mechanical arm locking and unlocking means associated with said support plate for, when said support plate is pushed by the cartridge while compressing said spring with said arm in said open position, moving said arm to said closed position and locking said arm in said closed position, and for, when said support plate is pushed by said cartridge while compressing said spring with said arm in said closed position, unlocking said arm to allow said arm to move to said open position.

2. A carrier device as claimed in claim 1 wherein said arm is movable relative to said support plate in a direction longitudinally of said passage, and such movement unlocks said arm to enable movement of said arm to said open position thereof.

3. A carrier device as claimed in claim 2, wherein said arm is mounted for pivoting movement about a pin between said closed and open positions.

4. A carrier device as claimed in claim 3, further comprising another spring biasing said arm to pivot about said pin in a direction toward said open position.

5. A carrier device as claimed in claim 1, wherein said arm is mounted for pivoting movement about a pin between said closed and open positions.

6. A carrier device as claimed in claim 5, further comprising another spring biasing said arm to pivot about said pin in a direction toward said open position.

7. A carrier device as claimed in claim 1, wherein said guide unit includes supply means to enable the supply of the cartridge to said carriage when said carriage is at said cartridge supply position.

8. A carrier device as claimed in claim 7, wherein said supply means comprises an opening through said guide unit.

9. A carrier device as claimed in claim 7, wherein said supply means comprises a cartridge inserting member to enable manual insertion of the cartridge into said carriage.

* * * * *